United States Patent
Plondke et al.

(10) Patent No.: US 7,383,420 B2
(45) Date of Patent: Jun. 3, 2008

(54) PROCESSOR AND METHOD OF INDIRECT REGISTER READ AND WRITE OPERATIONS

(75) Inventors: Erich Plondke, Austin, TX (US); Lucian Codrescu, Austin, TX (US); Muhammad Ahmed, Austin, TX (US); William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 11/089,619

(22) Filed: Mar. 24, 2005

(65) Prior Publication Data

US 2006/0218373 A1    Sep. 28, 2006

(51) Int. Cl.
*G06F 9/26* (2006.01)
*G06F 9/34* (2006.01)

(52) U.S. Cl. .................................. 711/220; 712/E9.04
(58) Field of Classification Search ............ 712/E9.04; 711/220
See application file for complete search history.

(56) References Cited

U.S. PATENT DOCUMENTS

| | | | | |
|---|---|---|---|---|
| 4,989,113 | A * | 1/1991 | Asal ............................ | 710/22 |
| 5,091,853 | A * | 2/1992 | Watanabe et al. ........... | 712/212 |
| 5,890,222 | A * | 3/1999 | Agarwal et al. ............. | 711/220 |
| 6,098,160 | A * | 8/2000 | Drake et al. ................. | 711/200 |
| 6,446,190 | B1 * | 9/2002 | Barry et al. .................. | 712/24 |
| 6,754,809 | B1 * | 6/2004 | Guttag et al. ................ | 712/225 |
| 2003/0028754 | A1 * | 2/2003 | Sugimoto .................... | 712/209 |

OTHER PUBLICATIONS

Understanding the IA-64 Archiecture, Pertinent pp. 1-3 Gautam Doshi, Intel Corporation Aug. 31, 1999-Sep. 2, 1999.*
IA-64 Application Developer's Archiecture Guide, May 1999 Pertinent pp. 7-154-156, and 7-165.*
Computer Architecture A quantitative approach third education, Hennessy and Patterson, Published: 2003 Pertinent pp. 129-136, 175, 218-222, 308-311 and 1A-2A.*
MIPS archiecture, Published Dec. 8, 2002, Pertinent pp. 1, 12-17 and 40.*
MC68030, Enhanced 32-bit microprocessor user's manual, motorola. Published: 1989 by Motorola, Inc. pp. 2-6 to 2-27.*
Short, Kenneth L. Microprocessors and programmed Logic Published: 1981 by prentice-hall. pp. 34-36.*

* cited by examiner

*Primary Examiner*—Eddie P Chan
*Assistant Examiner*—Idriss Alrobaye
(74) *Attorney, Agent, or Firm*—Nicholas J. Pauley; John L. Ciccozzi; Thomas Rouse

(57) ABSTRACT

A processor is operable to carry out a method that comprises accessing a first register based on a program instruction and obtaining a first register-out value, accessing a second register based on the first register-out value and obtaining a second register-out value, and storing the second register-out value into a third register based on the program instruction. The processor is further operable to carry out a method that comprises accessing a first register based on a program instruction and obtaining a first register-out value, accessing a second register based on the program instruction and obtaining a second register-out value, and storing the first register-out value into a third register based on the second register-out value.

18 Claims, 3 Drawing Sheets

| | | | | | | | | | | | | |
|---|---|---|---|---|---|---|---|---|---|---|---|---|
| T1 | DECODE | READ | I1 | I2 | I3 | I4 | WRITE ⟋31 | | | | | |
| T2 | | DECODE | READ | I1 | I2 | I3 | I4 | WRITE ⟋32 | | | | |
| T3 | | | DECODE | READ | I1 | I2 | I3 | I4 | WRITE ⟋33 | | | |
| T4 | | | | DECODE | READ | I1 | I2 | I3 | I4 | WRITE ⟋34 | | |
| T5 | | | | | DECODE | READ | I1 | I2 | I3 | I4 | WRITE ⟋35 | |
| T6 | | | | | | 36⟍DECODE | READ | I1 | I2 | I3 | I4 | WRITE |
| T1 | | | | | | | 37⟍DECODE | READ | I1 | I2 | I3 | I4 |
| | C1 | C2 | C3 | C4 | C5 | C6 | C7 | C8 | C9 | C10 | C11 | C12 |

FIG. 2

PROCESSOR AND METHOD OF INDIRECT REGISTER READ AND WRITE OPERATIONS

BACKGROUND

I. Field of the Invention

The disclosure herein pertains generally to processors, and more specifically to a processor and method of indirect register read and write operations.

II. Background

Digital signal processors are specialized processors that are capable of executing mathematical operations with speed. Digital signal processors (DSPs) may be used in image processing, audio processing, video processing, and many other applications. Digital signal processors are commonly embedded in a variety of devices such as mobile telephones, personal digital assistants, cameras, video cameras, and portable computing systems. To increase execution speed, some digital signal processors have an interleaved multithreading architecture to support concurrent execution of multiple hardware threads. Instructions from multiple threads are interleaved in the execution pipeline. This architecture enables the use of aggressive clock frequency while maintaining high core and memory utilization.

SUMMARY

A method and system for accessing values stored in any register using the value of another register as a register index are described herein. Values may be stored in registers and accessed in this manner for use in computations and other operations without accessing memory.

In one aspect of an embodiment of the disclosure, a method comprises accessing a first register based on a program instruction and obtaining a first register-out value, accessing a second register based on the first register-out value and obtaining a second register-out value, and storing the second register-out value into a third register based on the program instruction.

In another aspect of an embodiment of the disclosure, a method comprises reading a value from a source field of a program instruction, accessing a first register based on the source field value and obtaining a first register-out value, optionally performing a first mathematical/logical operation on the first register-out value, accessing a second register based on a result from the first mathematical/logical operation and obtaining a second register-out value, optionally performing a second mathematical/logical operation on the second register-out value, reading a value from a destination field of the program instruction, and storing a result from the second mathematical/logical operation into a third register based on the destination field value.

In another aspect of an embodiment of the disclosure, a computer-readable medium having encoded thereon a process for execution in a digital signal processor. The process comprises accessing a first register based on a program instruction and obtaining a first register-out value, accessing a second register based on the first register-out value and obtaining a second register-out value, and storing the second register-out value into a third register based on the program instruction.

In yet another aspect of an embodiment of the disclosure, a processor comprises means for accessing a first register based on a program instruction and obtaining a first register-out value, means for accessing a second register based on the first register-out value and obtaining a second register-out value, and means for storing the second register-out value into a third register based on the program instruction.

In yet another aspect of an embodiment of the disclosure, a method comprises accessing a first register based on a program instruction and obtaining a first register-out value, accessing a second register based on the program instruction and obtaining a second register-out value, and storing the first register-out value into a third register based on the second register-out value.

In yet another aspect of an embodiment of the disclosure, a computer-readable medium having encoded thereon a method comprises accessing a first register based on a program instruction and obtaining a first register-out value, accessing a second register based on the program instruction and obtaining a second register-out value, and storing the first register-out value into a third register based on the second register-out value.

In yet another aspect of an embodiment of the disclosure, a processor comprises means for accessing a first register based on a program instruction and obtaining a first register-out value, means for accessing a second register based on the program instruction and obtaining a second register-out value, and means for storing the first register-out value into a third register based on the second register-out value.

In yet another aspect of an embodiment of the disclosure, a processor comprises a first execution unit operable to access a first register based on a program instruction and obtain a first register-out value, and a second execution unit operable to access a second register based on the first register-out value, obtain a second register-out value, and store the second register-out value into a third register based on the program instruction.

BRIEF DESCRIPTION OF THE DRAWINGS

A more comprehensive understanding of this disclosure may be obtained by referencing the accompanying drawings when considered in conjunction with the subsequent detailed description.

FIG. 2 is a simplified timing diagram of the interleaved multithreading execution of the processor pipeline;

DESCRIPTION OF SPECIFIC EMBODIMENTS

Figure 1:
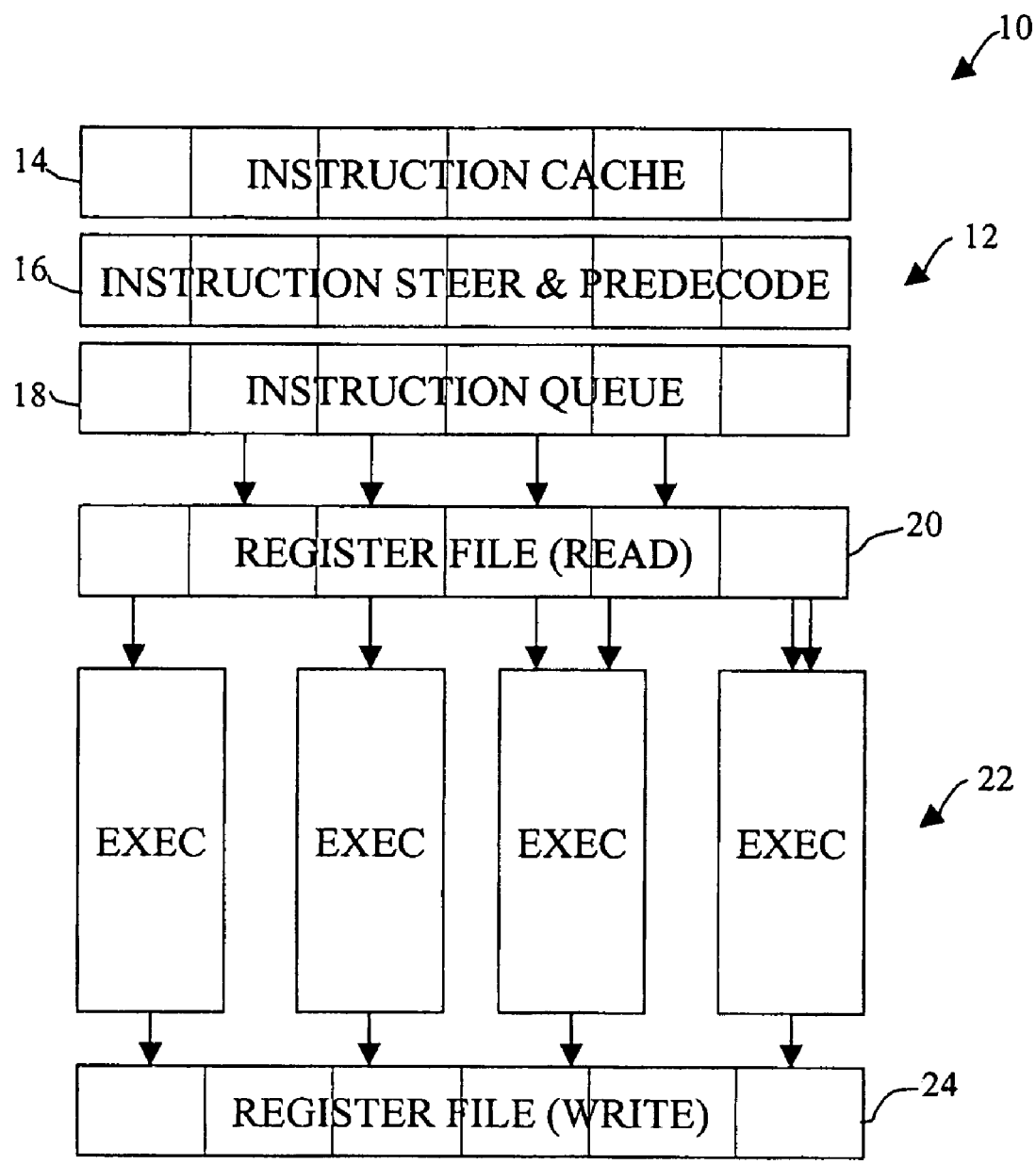
FIG. 1 is a simplified logical flow diagram of an embodiment of a processor pipeline.

FIG. 1 is a simplified logical flow diagram of an embodiment of a processor pipeline 10. The processor pipeline 10 may be implemented in a digital signal processor specialized in mathematical operations or in a general purpose processor. In one embodiment, the processor pipeline 10 has an interleaved multi-threading architecture that may execute six threads substantially simultaneously. The processor pipeline 10 comprises an instruction memory unit 12 comprising six threads. Program instructions are fetched from an instruction cache 14. An instruction steering and predecode logic 16 is then operable to resolve data dependencies and resource conflicts encoded in certain predetermined bits in the instructions and direct the instructions to specific execution units. The program instructions are then read into the instruction queue 18 pending execution. In an embodiment of the digital signal processor, each program instruction is an instruction packet containing four separate instructions.

Each instruction may comprise one or more source fields that may each contain an index into a register file to read a value to be used by the execution of the instruction. A register file may be thought of as an array of registers accessible by an index into the register file. A register file read operation 20 is then made to read the operands to execute the instruction for a thread. A plurality of execution units 22, such as four in this embodiment to execute each of the four instructions in the instruction packet, are operable to carry out the execution of the program instruction. A register file write operation 24 is then performed to save the execution results.

FIG. 2 is a simplified timing diagram of the interleaved multithreading execution. The interleaved multithreading architecture of the processor pipeline 10 enables six instructions from six threads 31-36 (T1 to T6) to be substantially simultaneously executed. In the embodiment of the digital signal processor as shown, each program instruction is an instruction packet containing four separate instructions. Each instruction packet may be executed in seven clock cycles, for example, for decoding (clock cycle C1), reading the operands from the register file (clock cycle C2), executing the four instructions (clock cycles C3-C6), and finally writing the results to the register file (clock cycle C7). While an instruction packet from the first thread is being decoded and then the register file read for operands, the second instruction packet is being decoded. Operating in this manner, the start of the execution of each successive instruction packet lags behind the prior instruction packet by one clock cycle. Taking advantage of this execution characteristic of the processor pipeline, a previously unattainable operation is possible. Previously, it was not practicable to perform an indirect read operation to read a value out of the register file and use it as an index into the register file again for a value to use in an operation. It was also not practicable to perform an indirect write operation to write a result into a location in the register file indexed by a value read from the register file. The logic to implement register file indirect read or write would have been too expensive and complex to implement. These operations are now practicable due to the extra time available to executing the instruction in a thread while other threads are being executed.

Figure 3:
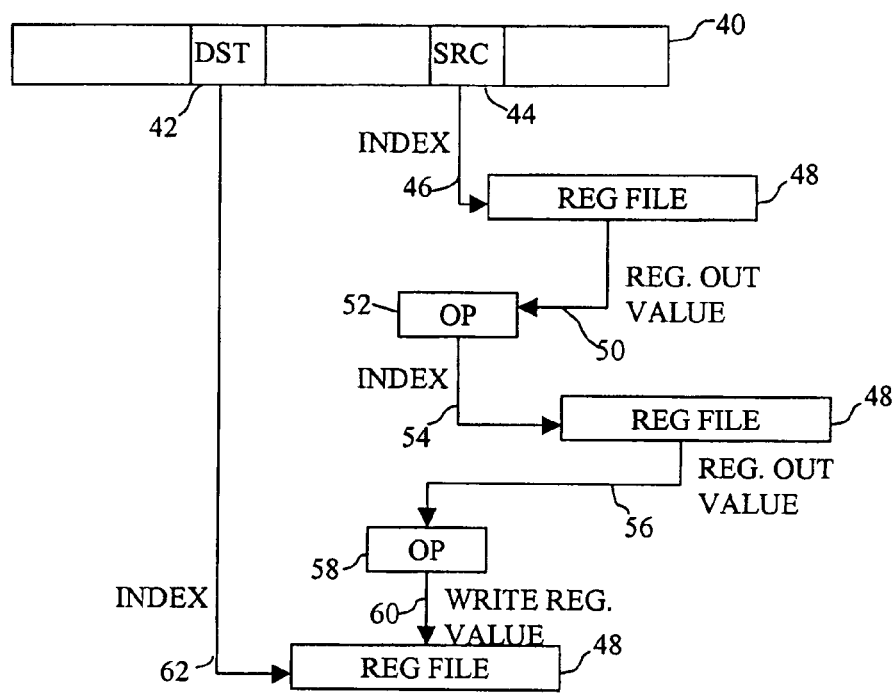
FIG. 3 is a logical flow diagram of an embodiment of an indirect read process.

FIG. 3 is a logical flow diagram of an embodiment of an indirect read process. A program instruction 40 may include a destination field 42 and a source field 44. The value in the source field 44 is first read and used as an index 46 into a register file 48. The value at the location in the register file 48 indicated by the index 46 is read from the register file 48 and the register-out value 50 may be used in a mathematical or logical operation 52. The mathematical or logical operation 52 may be addition, subtraction, multiplication, division, logic AND (or NAND), logic OR (or NOR), logic XOR, a bit-masking operation (such as to mask out a number of upper or lower bits), for example. The operation produces a result that is then used as an index 54 into the register file 48. The register-out value 56 read from the register file 48 is then used in another mathematical or logical operation 58, and the result 60 thereof is written into the register file 48 as indexed by an index value 62 read from the destination field 42 of the instruction 40. In the foregoing, the mathematical or logical operations 52 and/or 58 may be optional steps. An indirect read operation may have multiple iterations of reading a register to obtain a index into the register file to obtain another value, which may in turn be used as an operand or another register index. The implementation of this logic flow may be in hardware, software or a combination thereof.

Figure 4:
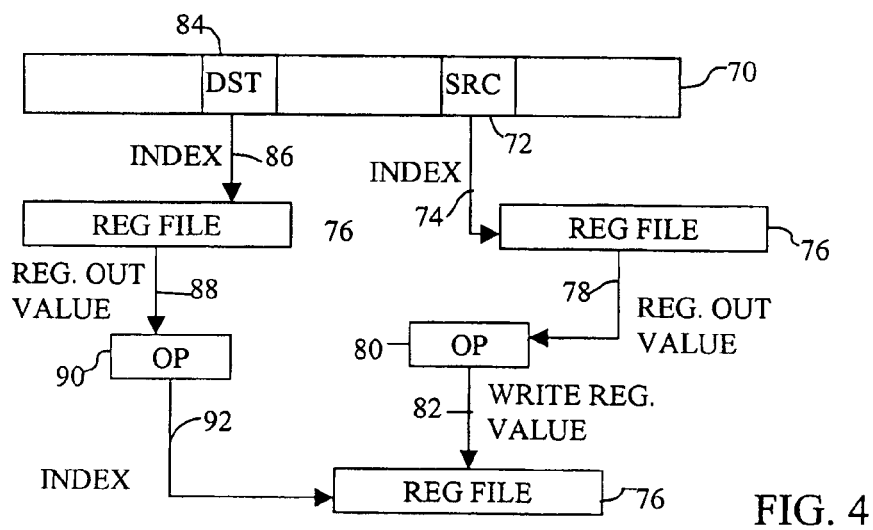
FIG. 4 is a logical flow diagram of an embodiment of an indirect write process.

FIG. 4 is a logical flow diagram of an embodiment of an indirect write process. A program instruction 70 includes a source field 72 with a value used as an index 74 into a register file 76. The register-out value 78 stored at the location indexed by the index 74 is read out to be used in a mathematical or logical operation 80. The result 82 is then written into the register file 76 at a location indicated by an index 92 determined by reading an index value 86 out of a destination field 84 of the program instruction 70 and used to read the register field 76. The register-out value 88 read from the register file 76 is then used in a mathematical or logical operation 90. The result from that operation is then used as the index into the register file 76 for storing the result from the operation 80. In this manner, an indirect write operation may have multiple iterations of reading a register to obtain a index into the register file to obtain another value, which may in turn be used as an operand or another register index indicative of a location to store a result. The implementation of this logic flow may be in hardware, software or a combination thereof.

It may be seen from the foregoing that by giving program code writers the ability to extract and store a value in any register based on the values stored in the registers, more flexibility to manipulate program logic is possible. Access to a set of values stored in the registers become possible even when the access pattern at compile time is unknown. Previously, it was difficult or clumsy to access values stored in registers based on the value of a register.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A device comprising:
    an interleaved multi-threaded processor comprising:
        at least one register file;
        a plurality of execution units coupled to the at least one register file;
        wherein the interleaved multi-threaded processor is adapted to:
            receive a first program instruction, the first program instruction including a first source field having a first index value and a first destination field having a second index value;
            process the first program instruction at the plurality of execution units;
            read the first index value to be used as a first index to the at least one register file, the first index value identifying a first location in the at least one register file;
            retrieve a first register out value from the first location of the at least one register file based on the first index value;
            perform an operation on the first register out value to obtain a first result;
            write the first result to a second location of the at least one register file based on a third index value;
            wherein the third index value is determined by:

retrieving a second register out value from a third location of the at least one register file based on the second index value;

performing an operation on the second register out value to determine the third index value; and wherein the first program instruction comprises four separate instructions and is executed in seven clock cycles, wherein the seven clock cycles comprise one clock cycle for decoding, one clock cycle for reading operands from the at least one register file, four clock cycles for executing the four separate instructions, and one clock cycle for writing results to the at least one register file.

2. The device of claim 1, wherein the third index value is further determined by reading the second index value to be used as a second index to the at least one register file, the second index value representing the third location in the at least one register file.

3. The device of claim 1, wherein the third index value identities a specific location in the register file.

4. The device of claim 1, wherein the interleaved multi-threaded processor is further adapted to:

receive a second program instruction at one of the plurality of execution units, the second program instruction including a second source field having a fourth index value and a second destination field having a fifth index value;

retrieve a third register out value from a fourth location of the at least one register file, the fourth location identified by the fourth index value;

perform an operation on the third register out value to obtain a sixth index value;

retrieve a fourth register out value from a fifth location of the at least one register file, the fifth location identified by the sixth index value;

perform an operation on the fourth register out value to obtain a second result; and write the second result to a location of the at least one register file based on the fifth index value.

5. The device of claim 4, wherein the fifth index value identifies a specific location in the register file.

6. The device of claim 4, wherein the operation on the fourth register out value to obtain a second result is optional.

7. The device of claim 1, wherein the interleaved multi-threaded processor further comprises an instruction queue coupled to the at least one register file.

8. The device of claim 1, wherein the interleaved multi-threaded processor further comprises a processor pipeline to execute multiple instructions.

9. The device of claim 7, wherein the interleaved multi-threaded processor further comprises six threads to enable six instructions to be executed substantially simultaneously.

10. The device of claim 1, wherein the operation is a mathematical operation.

11. The device of claim 1, wherein the operation is a logical operation.

12. The device of claim 1, wherein the operation is selected from the group consisting of addition, subtraction, multiplication, division, logic AND, logic NAND, logic OR, logic NOR, logic XOR, and a bit-masking operation.

13. The device of claim 1, wherein the interleaved multi-threaded processor further comprises logic adapted to resolve data dependencies and resource conflicts encoded in certain predetermined bits in the first program instruction and to direct the first program instruction to specific execution units.

14. A method comprising:

receiving a first program instruction, the first program instruction including a first source field having a first index value and a first destination field having a second index value;

processing the first program instruction at a plurality of execution units;

reading the first index value to be used as a first index to a register file, the first index value identifying a first location in the register file;

retrieving a first register out value from the first location of the register file based on the first index value;

performing an operation on the first register out value to obtain a first result;

writing the first result to a second location of the register file based on a third index value;

wherein the third index value is determined by:

retrieving a second register out value from a third location of the register file based on the second index value;

performing an operation on the second register out value to determine the third index value; and wherein the first program instruction comprises four separate instructions and is executed in seven clock cycles, wherein the seven clock cycles comprise one clock cycle for decoding, one clock cycle for reading operands from the at least one register file, four clock cycles for executing the four separate instructions, and one clock cycle for writing results to the at least one register file.

15. The method of claim 14, wherein the plurality of execution units are part of a multi-threaded interleaved processor.

16. The method of claim 14, wherein the third index value is determined by reading the second index value to be used as a second index to the register file, the second index value representing the third location in the register file.

17. The method of claim 14, further comprising:

receiving a second program instruction, the second program instruction including a second source field having a fourth index value and a second destination field having a fifth index value;

processing the second program instruction at the plurality of execution units;

retrieving a third register out value from a fourth location of the register file, the fourth location identified by the fourth index value;

performing an operation on the third register out value to obtain a sixth index value;

retrieving a fourth register out value from a fifth location of the register file, the fifth location identified by the sixth index value;

performing an operation on the fourth register out value to obtain a second result; and writing the second result to a location of the register file based on the fifth index value.

18. A computer-readable medium including instructions to cause a processor to execute a method comprising:

receiving a first program instruction, the first program instruction including a first source field having a first index value and a first destination field having a second index value;

processing the first program instruction at a plurality of execution units;

reading the first index value to be used us a first index to a register file, the first index value identifying a first location, in the register file;

retrieving a first register out value from the first location of the register file based on the first index value;

performing an operation on the first register out value to obtain a first result;

writing the first result to a second location of the register file based on a third index value;

wherein the third index value is determined by:

retrieving a second register out value from a third location of the register file based on the second index value;

performing an operation on the second register out value to determine the third index value; and wherein the first program instruction comprises four separate instructions and is executed in seven clock cycles, wherein the seven clock cycles comprise one clock cycle for decoding, one clock cycle for reading operands from the at least one register file, four clock cycles for executing the four separate instructions, and one clock cycle for writing results to the at least one register file.

\* \* \* \* \*